United States Patent Office 2,968,034
Patented Jan. 10, 1961

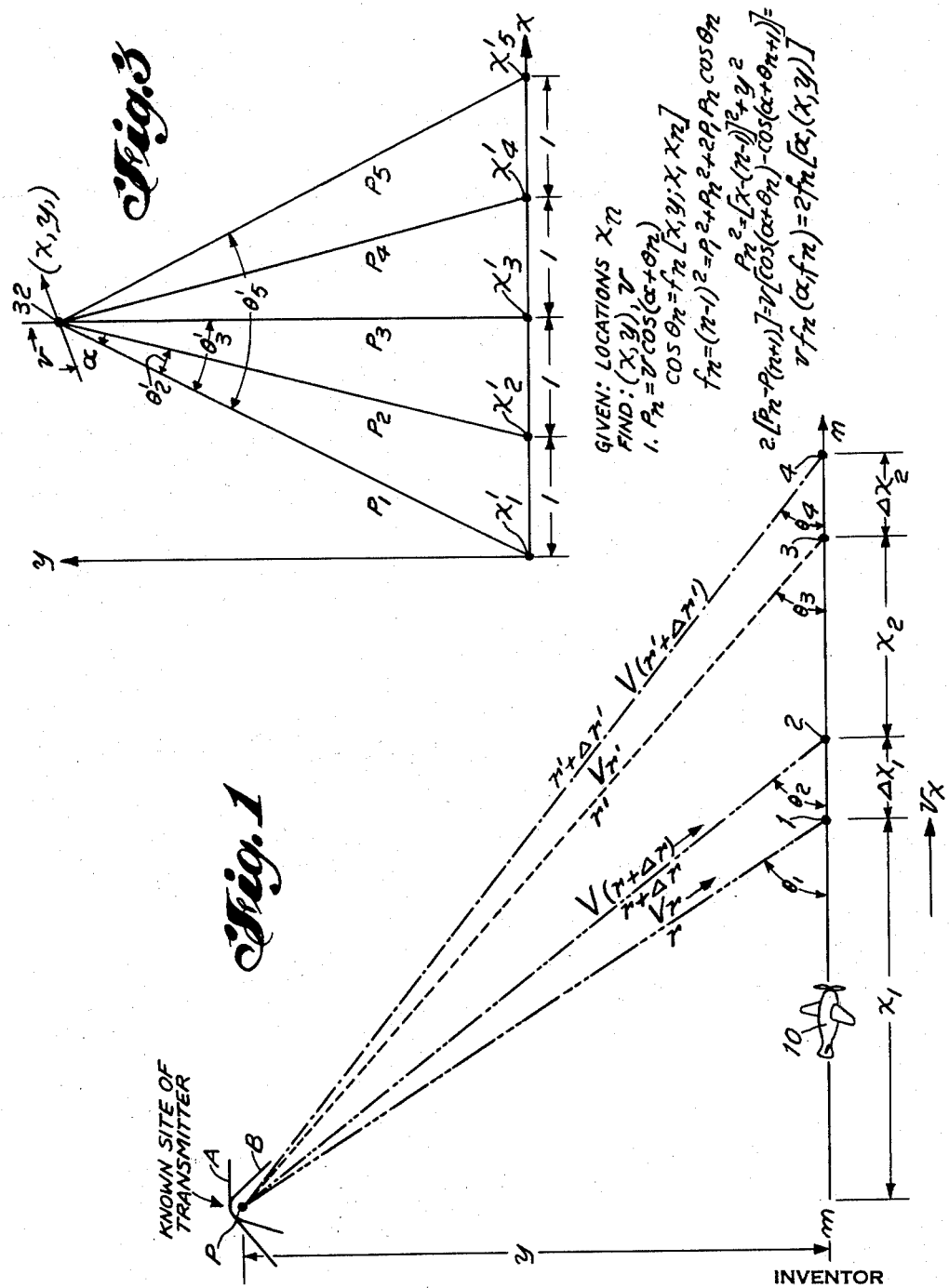

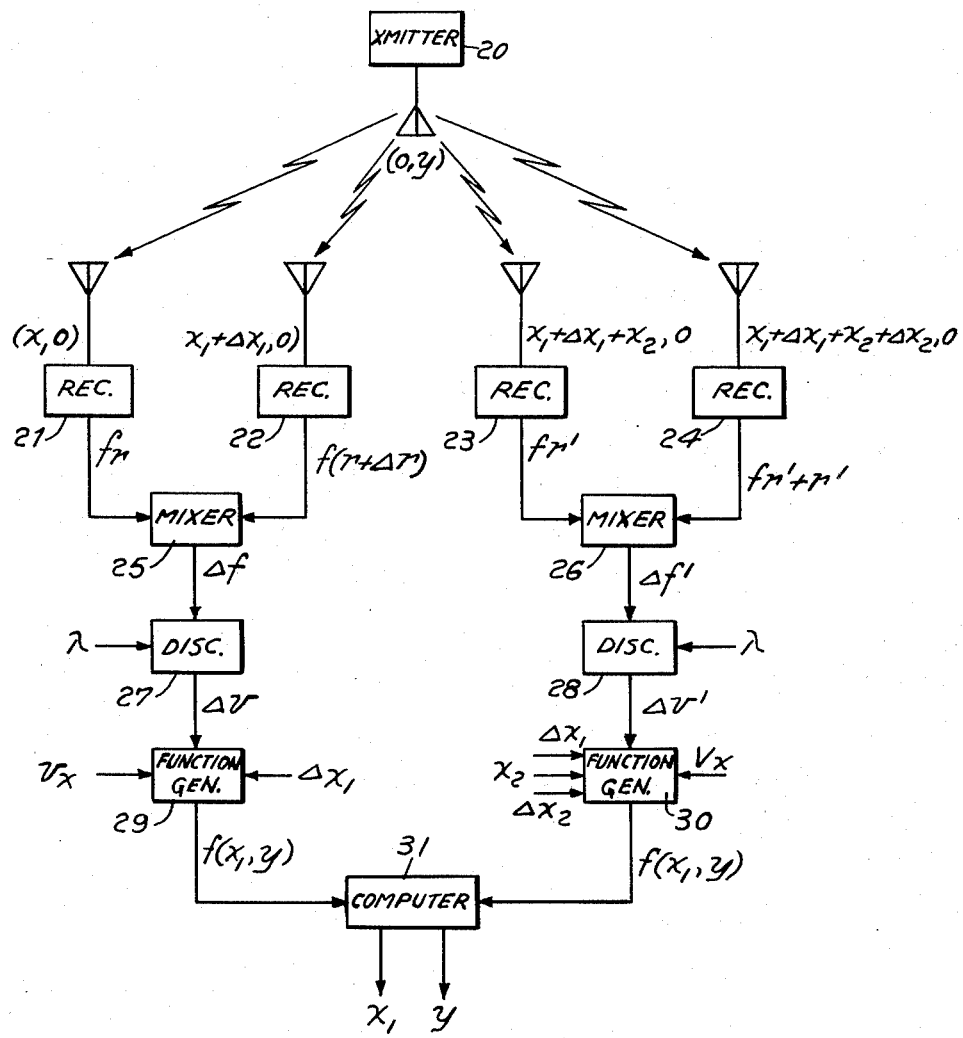

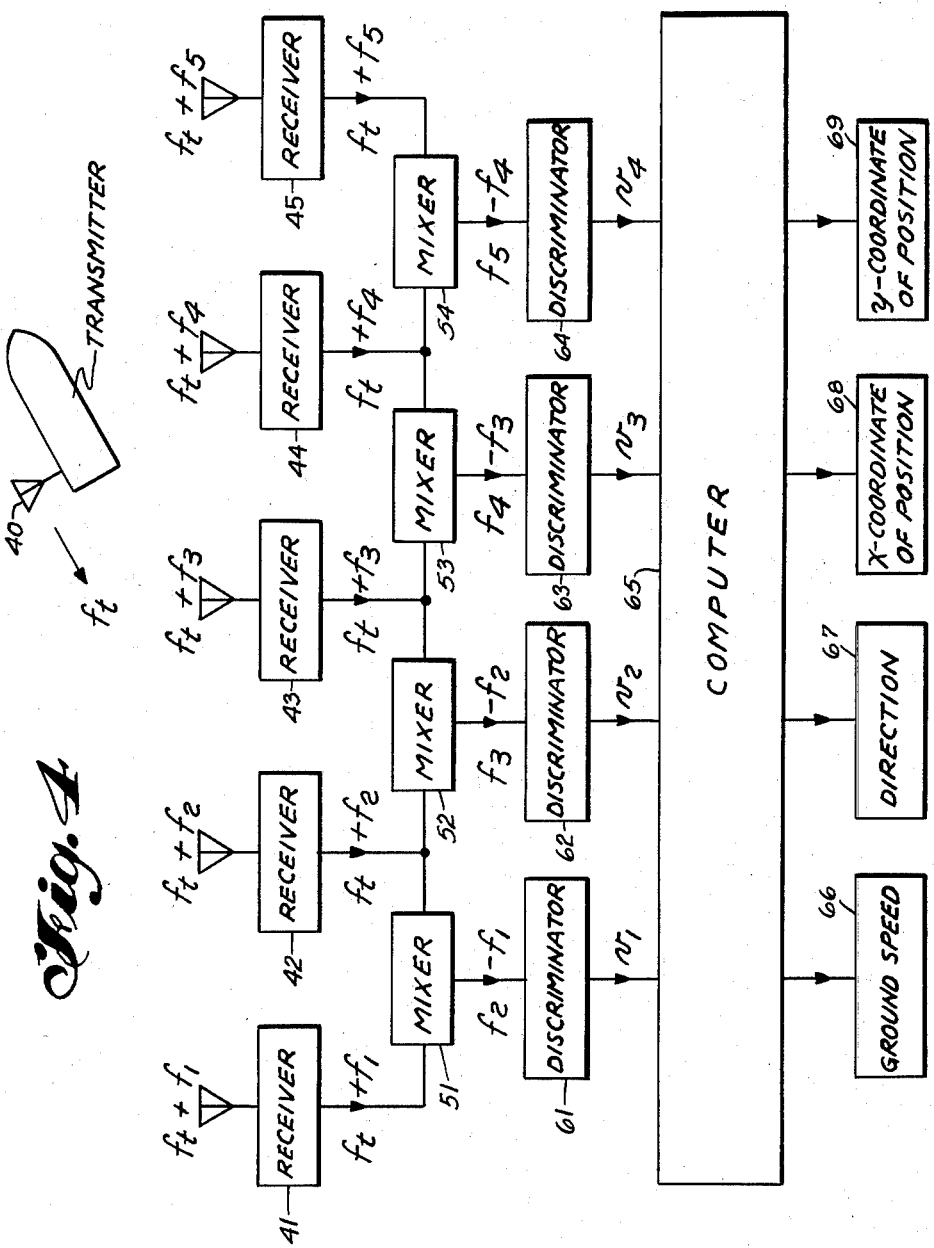

2,968,034

DOPPLER FREQUENCY POSITION FIXING METHOD

Nicholas J. Cafarelli, Jr., Westfield, N.J., assignor to International Telephone and Telegraph Corporation, Nutley, N.J., a corporation of Maryland Filed Aug. 16, 1955, Ser. No. 528,723

7 Claims. (Cl. 343—112)

This invention, in general, relates to position fixing methods and more particularly to a position fixing or direction finding method for determining the location of a moving terminal of a radio communication system relative to the known position of the other terminal.

In the past, position fixing systems which determine the position of one terminal of a radio system relative to the other terminal of the system have usually depended upon either directional receiving or transmitting systems of one form or another or in some instances upon specially coded transmissions. Through various methods of triangulation and geometric solutions the position of a non-directional radio transmitter could be plotted from the information obtained from these directional receivers. Conversely when a vehicle carrying a radio receiver desired to know its own location relative to the known location of a plurality of transmitters, it was necessary to utilize a directional receiving system and have the plurality of transmitters at known sites before a position fix could be accurately determined. With the advent of radar it has become possible to determine the direction, velocity, altitude, and position of a moving body independent of co-operative transmissions from or to the moving body, but these known systems again have depended upon directional transmissions.

Obviously, a method and system which could determine its own position from the known location of a source of radio signals, and thus yield a position fix of the receiver relative to the transmitter, or a system which could provide other direction determining information and which did not depend upon directional receiving or transmitting equipment would be of great advantage.

One of the objects of this invention, therefore, is to provide a position fixing method and system which is not dependent upon directional receiving or transmitting systems for its operation.

Another object of this invention is to provide a direction finding method and system dependent upon one terminal of the system moving relative to the position of the other terminal and yielding Doppler frequency signals from which position information is adduced.

Still another object of this invention is to provide a position fixing system capable of being utilized in determining the direction, speed and location of high speed vehicles such as guide missiles or supersonic aircraft from non-directional radio signals emitted by the vehicle.

One of the features of this invention is the dependency of this method of position fixing upon the obtaining of a Doppler frequency difference. Thus, one of the two terminal points of the position fixing system, i.e., either the transmitter or the receiver, preferably should be moving at a constant velocity and preferably in a straight line relative to the other terminal of the system. In addition, the sites of one terminal of this system must be at a known location unless only information of the position of one terminal relative to another is required. The difference in frequency is obtained between a plurality of paired points in order to yield the Doppler frequency differences and from these Doppler frequency differences computations are made which in one embodiment yield a family of curves whose intersection determines the location of the unknown terminal of the position fixing system.

More specifically the method of position fixing in accordance with the principles of my invention contemplates the reception at a plurality of positions of signals, emitted by a transmitter at a known location operating at a known frequency, by a receiver aboard a vehicle moving in a straight line at a constant velocity. The Doppler frequency difference from the signals received at paired positions is obtained from which a change in the relative axial velocity of the receiver to the transmitter is obtained. Knowing the relative change in axial velocity at at least two pairs of positions and knowing the vehicle's velocity along the straight line path and knowing the time elapsed between the reception of signals at the plurality of positions enables the operator to determine the location of the transmitter.

The above-mentioned and other features and objects of this invention will become more apparent by reference to the following description taken in conjunction with the accompanying drawing, in which:

Figs. 1 and 3 are schematic diagrams helpful in explaining the method of position fixing, and Figs. 2 and 4 are schematic diagrams in block form of embodiments of my system for determining the location of one terminal of a communication system by use of the Doppler effect.

Fig. 1 of the drawing is a schematic diagram helpful in explaining the method of determining, in accordance with the principles of my invention, the position of a vehicle, knowing the location of the site of a constant frequency signal source. It is assumed that the site of transmitter P emitting signals at a constant frequency $f$ is known and therefore the position of a vehicle can be determined without resorting to directional antennas or directional receiving systems of any kind and without any "off-course" maneuvering of the vehicle carrying the reception apparatus. Let it be assumed that point P is the known site of a "non-cooperative" radio transmitter emitting signals of a known constant frequency. Let line $mn$ represent the flight path of an aircraft 10 carrying the receiving apparatus. As will hereinafter be made clear, it is not necessary for the receiving apparatus carried by the aircraft 10 to have any directional characteristics. Let the aircraft 10 be traveling along the flight path $mn$ in the positive $x$ direction at a constant velocity $v_x$. One of the conditions necessary for the application of this method of direction finding is that the aircraft continue on the straight line flight path $mn$ at the constant velocity $v_x$. At four different positions indicated by reference characters 1, 2, 3 and 4 the aircraft makes measurements of the frequency of the signals received from the transmitter at site P. The aircraft 10 will cover a distance $\Delta x_1$ between positions 1 and 2, a distance $x_2$ between positions 2 and 3 and a distance $\Delta x_2$ between positions 3 and 4. Since the aircraft is flying at a constant velocity $v_x$ and the time taken to fly between positions 1 and 2, 2 and 3, and between positions 3 and 4 can be accurately determined, the distances $\Delta x_1$, $x_2$ and $\Delta x_2$ are known. Let it also be assumed that the airplane has an axial velocity relative to the signal source P at each of the positions 1, 2, 3 and 4 and these axial velocities will be respectively referred to as $V_r$, $V_{(r+\Delta r)}$, $V_{r'}$ and $V_{(r'+\Delta r')}$. The distance between the positions of the aircraft 10 when making the measurements at 1, 2, 3 and 4 and the site of the transmitter can be represented by $r$, $r+\Delta r$, $r'$, and $r'+\Delta r'$. Let it be assumed that the frequencies of the signal source received at locations 1, 2, 3 and 4 are $f_r$, $f_{(r+\Delta r)}$, $f_{r'}$, and $f_{(r'+\Delta r')}$, respectively.

From Fig. 1 it is seen that $r$ does not equal $r+\Delta r$ which does not equal $r'$ which does not equal $r'+\Delta r'$ and from this fact it can also be assumed that each of the axial velocities is not equal to any of the other axial velocities and since this is true the frequency received at each of the locations 1, 2, 3 and 4 is different from the frequency received at each of the other locations since the Doppler frequency due to the relative axial velocity adds or subtracts to the transmitted frequency in relation to the axial velocity of the aircraft projected onto its true velocity vector relative to the transmitter site P. It is, of course, possible to obtain the frequency difference $\Delta f$ between the signals received at point 2 and the signals received at point 1

$$[f_{(r+\Delta r)} - f_r]$$

and relate them to the axial velocities at each of these two points respectively $[V_{(r+\Delta r)} - V_r]$ and the same relationship holds for the measurements made at points 3 and 4. Thus $[f_{(r'+\Delta r')}] - f_{r'}$ is related to $$[V_{(r'+\Delta r')}] - V_{r'}$$

It is also apparent from the geometry that there is relationship between the axial velocities and the distance between site P and the aircraft position when making the measurements and thus $(r+\Delta r) - r$ is related to $$[V_{(r+\Delta r)}] - V_r$$

We now have a difference between two lines measured from two different points 1 and 2 which determines a hyperbola A formed by the constant $(r+\Delta r) - r$. Similarly, a hyperbola B can be formed from the measurements made at points 3 and 4 and detemined by the difference between $(r'+\Delta r')$ and $r'$ as measured by the Doppler frequencies $[f_{(r'+\Delta r')}] - f_{r'}$. The intersection of the two hyperbolas A and B yields the location of the signal source P and, as shown above, it is obtained without the necessity of resorting to any directional receiving system.

Referring again to Fig. 1, let it be assumed that a vehicle having an omnidirectional receiver aboard capable of accurately measuring frequency is proceeding along a given straight line path $mn$ and at point 1 makes a measurement of the frequency $f_r$ of the signals received from the transmitter at unknown location P. After proceeding along path $mn$ for a given time $t$ at a velocity $v_x$, and covering distance $\Delta x_1$, a second measurement of the received signal frequency is made and results in a second frequency $f_{(r+\Delta r)}$ different from the first frequency $f_r$ because of the difference in radial or axial velocities of the craft at point 1 and point 2 relative to the transmitter site P. Obviously the change in Doppler frequency $\Delta f$ is equal to $[f_{(r+\Delta r)}] - f_r$. It is also apparent that the change in radial velocity $\Delta v$ is equal to $$\Delta v = v_{(r+\Delta r)} - v_r \quad (1)$$

The received frequency, $f_r$, equals the transmitted frequency $f$ minus the effect of the radial velocity of the vehicle (Doppler effect) or $$f_r = \frac{k - v_r}{\lambda} \quad (2)$$

where $k$ is a constant related to the transmitter frequency $f$ and $\lambda$ is the transmitted wavelength. Similarly $$f_{(r+\Delta r)} = \frac{k - v_{(r+\Delta r)}}{\lambda} \quad (3)$$

It then follows that $$\Delta f = f_{(r+\Delta r)} - f_r = \frac{k + v_{(r+\Delta r)}}{\lambda} - \frac{k - v_r}{\lambda} = \frac{v_{(r+\Delta r)} - v_r}{\lambda} = \frac{\Delta v}{\lambda} \quad (4)$$

In a similar manner additional measurements can be made after the vehicle has traversed distances $x_2$ and $\Delta x_2$. The measurements made at points 3 and 4 will yield the following equations $$\Delta v' = v_{(r'+\Delta r')} - v_{r'} \quad (5)$$

$$\Delta f' = f_{(r'+\Delta r')} - f_{r'} = \frac{k - v_{(r'+\Delta r')}}{\lambda} - \frac{k - v_{r'}}{\lambda} = \frac{\Delta v'}{\lambda} \quad (6)$$

From the geometry of Fig. 1 it is seen that $$v_r = v_x \cos \theta_1 = v_x \frac{x_1}{r} \quad (7)$$

where $r = \sqrt{x_1^2 + y^2}$ $$v_r = v_x \left( \frac{x_1}{\sqrt{x_1^2 + y^2}} \right) \quad (8)$$

$$v_{(r+\Delta r)} = v_x \cos \theta_2 = v_x \left( \frac{x + \Delta x}{r + \Delta r} \right) \quad (9)$$

where $r + \Delta r = \sqrt{(x_1 + \Delta x_1)^2 + y^2}$ $$v_{(r+\Delta r)} = v_x \left( \frac{x_1 + \Delta x_1}{\sqrt{(x_1 + \Delta x_1)^2 + y^2}} \right) \quad (10)$$

$$\Delta v = v_{(r+\Delta r)} - v_r = v_x \left[ \frac{x_1 + \Delta x_1}{\sqrt{(x_1 + \Delta x_1)^2 + y^2}} - \frac{x_1}{\sqrt{x_1^2 + y^2}} \right] \quad (11)$$

In a similar manner $$v_{r'} = v_x \cos \theta_3 = v_x \frac{x_1 + \Delta x_1 + x_2}{r'} \quad (12)$$

where $r' = \sqrt{(x_1 + \Delta x_1 + x_2)^2 + y^2}$ $$v_{r'} = v_x \left( \frac{x_1 + \Delta x_1 + x_2}{\sqrt{(x_1 + \Delta x_1 + x_2)^2 + y^2}} \right) \quad (13)$$

$$v_{(r'+\Delta r')} = v_x \cos \theta_4 = v_x \left( \frac{x_1 + \Delta x_1 + x_2 + \Delta x_2}{r' + \Delta r'} \right) \quad (14)$$

where $r' + \Delta r' = \sqrt{(x_1 + \Delta x_1 + x_2 + \Delta x_2)^2 + y^2}$ $$v_{(r'+\Delta r')} = v_x \left( \frac{x_1 + \Delta x_1 + x_2 + \Delta x_2}{\sqrt{(x_1 + \Delta x_1 + x_2 + \Delta x_2)^2 + y^2}} \right) \quad (15)$$

$$\Delta v' = v_{(r'+\Delta r')} - v_{r'}$$
$$= v_x \left[ \frac{x_1 + \Delta x_1 + x_2 + \Delta x_2}{\sqrt{(x_1 + \Delta x_1 + x_2 + \Delta x_2)^2 + y^2}} - \frac{x_1 + \Delta x_1 + x_2}{\sqrt{(x_1 + \Delta x_1 + x_2)^2 + y^2}} \right] \quad (16)$$

Since the vehicle has proceeded along path $mn$ at a constant rate $v_x$ and the elapsed time for the vehicle to proceed from point 1 to point 2 and then to point 3 and to point 4 is known, the distances $\Delta x_1$ and $x_2$ and $\Delta x_2$ are all known quantities along with the vehicle's velocity $v_x$. $\Delta v$ and $\Delta v'$ can be determined from Equations 4 and 6 and the measurements made of the frequencies received at points 1, 2, 3 and 4 provided the wavelength of the transmitted signal is known. If $\lambda$ is known then Equations 11 and 16 reduce to two unknowns, $x_1$ and $y$, which with two Equations 11 and 16 can be solved to determine the location P.

It is also possible to locate P where $\lambda$ is not known since in that case $$\Delta v = C \left[ \frac{x_1 + \Delta x_1}{\sqrt{(x_1 + \Delta x_1)^2 + y^2}} - \frac{x_1}{\sqrt{x_1 + y^2}} \right] \quad (17)$$

where C is a constant related to $v_x$ and $\lambda$ both of which are constants and to $\Delta f$:

$$\Delta v' = D \left[ \frac{x_1 + \Delta x_1 + x_2 + \Delta x_2}{\sqrt{(x_1 + \Delta x_1 + x_2 + \Delta x_2)^2 + y^2}} - \frac{x_1 + \Delta x_1 + x_2}{\sqrt{(x_1 + \Delta x_1 + x_2)^2 + y^2}} \right] \quad (18)$$

where D is a constant related to $v_x$, $\lambda$ and $\Delta f'$. Thus $$\Delta v = F(x, y)$$

and $$\Delta v' = F(x, y)$$

Each of the above equations is a function of two unknowns and yields a hyperbola, the intersection of which yields the position of the transmitter at point P.

Referring to Fig. 2 of the drawing, a schematic diagram in block form of one embodiment of my invention is shown wherein a plurality of receivers 21, 22, 23, and 24 are shown cooperating with a moving transmitter 20 and in which only short term frequency stability, e.g., milliseconds, is required. It is of course apparent that the four receivers 21, 22, 23 and 24 are located at the four locations $(x_1, 0)$, $(x_1+\Delta x_1, 0)$, $(x_1+\Delta x_1+\Delta x_2, 0)$ and $(x_1+\Delta x_1+x_2+\Delta x_2, 0)$ respectively. The received frequency from each pair of receivers is coupled to the subtraction networks 25 and 26 respectively. The output of the subtraction networks 25 and 26 is the Doppler frequencies $\Delta f$ and $\Delta f'$ which, as heretofore explained, are related by $\lambda$ to the difference axial velocities $\Delta v$ and $\Delta v'$. Thus the Doppler frequencies $\Delta f$ and $\Delta f'$ along with $\lambda$, the transmitted wavelength, are coupled respectively to networks 27 and 28 to generate outputs $\Delta v$ and $\Delta v'$.

As shown also, when given $\Delta v$, $\Delta x_1$ and $v_x$;$x_1$ and $y$ remain the only unknowns in the equation and thus the output of function generator 29 is a function $(x_1, y)$ in accordance with Equation 11. Similarly, function generator 30 has an output in accordance with Equation 16 which is a function of $(x_1, y)$ responsive to the inputs $\Delta v'$, $\Delta x_2$, $\Delta x_1$, $x_2$ and $v_x$. The outputs from the generators 29 and 30 are fed to a computer 31 which may be analogue or digital to solve the two Equations 11 and 16 having the two unknowns $x_1$ and $y$.

Referring to Fig. 3 of the drawing, a method of determining the position, velocity and heading of a vehicle from a plurality of receivers at known locations is diagrammatically illustrated. A vehicle 32 is assumed to be transmitting a signal at frequency $f$ while at location $(x, y)$ and traveling at an unknown velocity $v$. As heretofore explained, it is possible to determine the difference in axial velocity $\delta_n$ of the transmitter 32 relative to any two receiver locations by measuring the Doppler frequency difference of the signals received at the two locations. Thus, the axial velocity vector $P_n$ at any receiving position $n$ is:

$$P_n = v \cos(\alpha+\theta_n)$$

where $\alpha$ and $\theta$ are as shown in Fig. 3

$$\cos \theta_n = f_n[x, y; x_1, x_n]$$

implicitly:

$$f_n = (n-1)^2 = P_1^2 + P_n^2 + 2P_1P_n \cos \phi_n$$
$$P_n^2 = [x-(n-1)]^2 + y^2$$

$$P_n - P_{(n+1)} = \delta_n = v[\cos(\alpha+\theta_n) - \cos[\alpha+\theta_{(n+1)}]]$$
$$= vf_n(\alpha, f_n) = vf_n[\alpha(x, y)]$$

Each $\delta_n$ or axial velocity relative to each receiver location is a function of four unknowns $v$, $\alpha$, $x$, $y$ and thus four measurements of $\delta_n$ are required to determine the unknowns. However, since each $\delta_n = P_n - P_{(n+1)}$, to obtain four independent $\delta_n$ requires five receiver locations. Thus:

$$\delta_1 = P_1 - P_2 \qquad \delta_4 = P_4 - P_5$$
$$\delta_2 = P_2 - P_3 \qquad P_1 = v \cos(\alpha+\theta_1)$$
$$\delta_3 = P_3 - P_4 \qquad \cos \theta_1 = f_n(x)$$

Referring to Fig. 4 of the drawing, a system in which a C.W. transmitter cooperates with a multiplicity of receivers to obtain a simultaneous and instantaneous indication of the following flight parameters; speed, direction and position, is shown. While the following discussion is concerned primarily with the two dimension phenomena, its extension to three dimensions is complicated only by equipment complexity, e.g., an additional receiver site with associated computing equipment. In a preferred embodiment of this invention, a UHF transmitter is carried by a high speed aircraft or missile and an arrangement of receivers 41—45 is dispersed over a substantial ground area. Each of the receivers detects a Doppler frequency, the difference of which between adjoining receivers is detected in mixers 51—54. These differences and frequencies are converted to differences in velocity by discriminators 61—64. These velocities are fed to a computer 65 which is capable of solving four simultaneous equations and the output of which actuates four indicators 66—69 which indicate the ground speed, direction and $x$ and $y$ coordinates of the C.W. transmitter position.

To be more specific, referring again to the drawing, a C.W. transmitter 40 is carried by the vehicle and the five receivers 41—45 are located at any suitable ground coordinates. The received frequencies are different than the transmitter frequency and, of course, different from each other by amounts which are dependent upon the speed, direction and position of the vehicle. The outputs of receivers 41—45 are paired into the mixers 51—54 whose outputs are the difference frequency between two of the adjacent receivers and provides the input to the frequency discriminators 61—64. One of the parameters of the output voltages of the discriminator identifies the sense of the frequency input to the mixers. This parameter may be polarity or magnitude. The output voltages of the discriminators provide the input to the computer 65 which, in turn, solves four simultaneous equations and accomplishes the mathematical interpretations of these voltages in accordance with the equations prescribed above. The computer output may be utilized to actuate the four indicators or may be of the analogue type having its output coupled to a graphic display.

It should of course be noted that conventional Doppler systems measure only the velocity component of the aircraft in an axial direction relative to the ground installation and that these existing Doppler systems require as a prerequisite to successful operation a highly stable signal source, whereas my system, in addition to measuring a plurality of flight parameters, does not require a stable signal source since the system is actuated by the incremental rather than the absolute values of a Doppler frequency. The absolute value of the frequency source not being critical, that is, it need be maintained only during a measuring period of about one second, long term variations of this frequency do not disturb the principles of my invention.

While I have described above the principles of my invention in connection with specific apparatus, it is to be clearly understood that this description is made only by way of example and not as a limitation to the scope of my invention as set forth in the objects thereof and in the accompanying claims.

I claim:

1. A method of determining the unknown location of one terminal of a radio communication system relative to the known location of another terminal of said system when said terminals are moving relative to each other, comprising the steps of:

(a) receiving the transmissions from one of said terminals at a plurality of receiving locations known distances apart, (b) obtaining the Doppler frequency difference in the transmissions received at adjacent pairs of receiving locations, and (c) computing from said Doppler frequency difference the change in axial velocity of one of said terminals relative to each of said pairs of receiving locations and computing from said change in axial velocity the location of the unknown terminal of said communication system.

2. A method of determining the unknown position of radio receiver equipment, which is caused to move at a constant velocity along the straight line path, relative to the known location of a radio transmitter, comprising the steps of:

(a) detecting the frequency of the signals received at at least four receiving positions, (b) determining the distances between adjacent receiving positions, (c) mixing the signals detected at adjacent receiving positions to obtain the Doppler frequency difference, (d) computing from said Doppler frequency difference the change in axial velocity of said receiving equipment at said receiving positions relative to said transmitter location, and (e) computing from said change in axial velocity the location of said receiving equipment relative to said transmitter equipment.

3. A method of determining the unknown location of a moving source of substantially constant frequency radio signal transmission relative to at least five receiving sights at known locations, comprising the steps of:

(a) detecting the transmitted signals at each of said receiving sights, (b) mixing the signals detected at adjacent receiving sights to obtain the Doppler frequency difference between the mixed signals, (c) obtaining from each Doppler frequency difference an indication of the difference in the axial velocity of said transmitter relative to said adjacent receiving sight, and (d) computing from at least four of said axial velocity differences and the known locations of said receiving sights the position of said transmitter.

4. A method of determining the unknown position of radio receiver equipment relative to the known location of a radio transmitter, comprising the steps of:

(a) detecting at two pairs of receiving positions, each position of each pair a known distance from the other position of each pair, the signals transmitted from said known location, (b) mixing the signals detected at each pair to obtain the Doppler frequency difference, and (c) obtaining from each of said Doppler frequency differences an indication of the difference in axial velocity between said receiving pair locations and said transmitter location and obtaining from each of said axial velocity differences a hyperbola the intersection of which determines the location of said radio transmitter.

5. A system for determining the location of a transmitter emitting a radio signal at a constant frequency from the signals received at at least five receiving locations comprising at least five receivers located a given distance apart, means at each of said receivers to detect said transmissions, means to mix the detected signals from adjacent pairs of receivers, means to generate a signal responsive to the output of said mixer means indicative of the difference in axial velocity of said transmitter relative to said adjacent pairs of receivers and means responsive to at least four of said axial velocity difference signals to compute the position of said transmitter relative to said receiving sights.

6. A system for determining the location, velocity and direction of motion of a transmitter from the signals received at a plurality of receiving locations comprising a receiver at each location responsive to said transmitter, a plurality of signal mixing means each coupled to a different pair of adjacent receivers, a plurality of means each responsive to the output of a different one of said mixing means for producing a signal indicative of the difference in axial velocity of said transmitter relative to each of the receivers in a pair, and computer means coupled to said plurality of means for producing signals for computing the location, velocity and direction of motion of said transmitter.

7. A system for determining the location, velocity and direction of motion of a craft transmitting a signal comprising a plurality of spaced receivers at known locations each responsive to said transmitted signal, a plurality of frequency mixers each coupled to a different pair of said receivers, a plurality of discriminators each coupled to one of said frequency mixers and each producing a signal indicative of the difference in axial velocity of said transmitter relative to each of the receivers in a pair, and computer means coupled to said plurality of discriminators for computing the location, velocity and direction of motion of said craft.

References Cited in the file of this patent

UNITED STATES PATENTS

| | | |
|---|---|---|
| 1,406,996 | Morrill | Feb. 21, 1922 |
| 2,406,953 | Lewis | Sept. 3, 1946 |
| 2,527,548 | Hastings | Oct. 31, 1950 |
| 2,608,685 | Hastings | Aug. 26, 1952 |
| 2,817,081 | Roberts | Dec. 17, 1957 |

OTHER REFERENCES

"Doppler Tracking for Guided Missiles," Aviation Week, Sept. 15, 1947 (pages 28 and 30 relied on).